United States Patent
Rodgers et al.

(10) Patent No.: US 12,299,522 B2
(45) Date of Patent: May 13, 2025

(54) SYSTEM AND METHOD FOR INTEGRATING INTERACTIVE OBJECTS AND ATTRACTION EXPERIENCES

(71) Applicant: Universal City Studios LLC, Universal City, CA (US)

(72) Inventors: Rachel E. Rodgers, Orlando, FL (US); Wei C. Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 156 days.

(21) Appl. No.: 17/945,719

(22) Filed: Sep. 15, 2022

(65) Prior Publication Data
US 2024/0095472 A1    Mar. 21, 2024

(51) Int. Cl.
*G06K 7/10* (2006.01)
*A47B 81/00* (2006.01)

(52) U.S. Cl.
CPC .......... *G06K 7/10297* (2013.01); *A47B 81/00* (2013.01)

(58) Field of Classification Search
CPC ..... A47B 81/00; A63G 31/00; G06K 7/10297
See application file for complete search history.

(56) References Cited

U.S. PATENT DOCUMENTS

| | | | |
|---|---|---|---|
| 9,558,608 B2 | 1/2017 | Amdahl | |
| 2006/0158308 A1* | 7/2006 | McMullen | G06Q 10/00 340/5.4 |
| 2012/0211397 A1* | 8/2012 | Kilian | G06K 7/10178 206/719 |
| 2012/0240191 A1* | 9/2012 | Husney | H04W 12/06 726/3 |
| 2012/0255550 A1* | 10/2012 | Langerock | A61M 16/1075 128/204.17 |

(Continued)

FOREIGN PATENT DOCUMENTS

| | | |
|---|---|---|
| AU | 2016204771 B2 | 10/2018 |
| JP | 2008250876 A | 10/2008 |

(Continued)

OTHER PUBLICATIONS

PCT/US2023/032777 International Search Report and Written Opinion mailed Jan. 8, 2024.

*Primary Examiner* — Quan Zhen Wang
*Assistant Examiner* — Mancil Littlejohn, Jr.
(74) *Attorney, Agent, or Firm* — Fletcher Yoder, P.C.

(57) ABSTRACT

An entertainment system includes a first storage area and a second storage area. Further, the system includes a first communicator and a second communicator each configured to read information from an interactive object, wherein the first communicator is configured to monitor the first storage area and the second communicator is configured to monitor the second storage area. A controller of the system includes a processor and a memory. The controller is configured to receive data from the communicators and query a database to determine one or more profiles associated with the data, determine a special effect associated with a first profile and a special effect associated with a second profile, and provide a command to present the first special effect at a first location based on the first storage area and provide a command to present the second special effect at a second location based on the second storage area.

20 Claims, 3 Drawing Sheets

(56) References Cited

U.S. PATENT DOCUMENTS

| | | | |
|---|---|---|---|
| 2019/0201806 A1* | 7/2019 | Weston | A63G 31/16 |
| 2019/0302991 A1 | 10/2019 | Vyas et al. | |
| 2022/0054948 A1 | 2/2022 | Yeh et al. | |
| 2022/0214742 A1* | 7/2022 | Yeh | G06F 3/016 |

FOREIGN PATENT DOCUMENTS

| | | | |
|---|---|---|---|
| JP | 2009084837 A | 4/2009 | |
| KR | 20040027031 A | 4/2004 | |
| WO | 2022119771 A1 | 6/2022 | |
| WO | 2022147526 A1 | 7/2022 | |

\* cited by examiner

SYSTEM AND METHOD FOR INTEGRATING INTERACTIVE OBJECTS AND ATTRACTION EXPERIENCES

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Entertainment companies often provide ride shows that incorporate special effects for improving a guest's experience throughout the ride shows. In recent years, entertainment companies have also started providing interactive objects that can be utilized throughout entertainment environments (e.g., in open areas and queues) to provide more prevalent entertainment opportunities. For example, toys that are detectable or operable to interface with gaming elements in a theme park may be provided to guests to facilitate their increased enjoyment of the theme park. Prior to experiencing certain ride shows, a guest may carry an interactive object (e.g., a toy sword that is detectable by radio frequency identification technology) while waiting in line for the ride show, and may store the object temporality within a storage area prior to entering a ride vehicle and/or a ride show environment. Storing the interactive object may be necessary to avoid potential for losing the interactive object or otherwise interfering with the ride show. However, it is now recognized traditional storage techniques may cause an undesirable disconnect between certain entertainment experiences and opportunities associated with the interactive objects.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an entertainment system includes a first storage area and a second storage area, a first communicator and a second communicator each configured to read information from an interactive object, wherein the first communicator is configured to monitor the first storage area and the second communicator is configured to monitor the second storage area. Additionally, the entertainment system includes a controller comprising a processor and a memory, wherein the controller is configured to receive data from the first communicator and the second communicator, query a database to determine one or more profiles associated with the data, and determine a first special effect associated with a first profile and a second special effect associated with a second profile. Further the controller is configured to provide a command to present the first special effect at a first location based on the first storage area and provide a command to present the second special effect at a second location based on the second storage area.

In an embodiment, a method includes receiving, via a receiver, first data from a first communicator associated with a first storage area and second data from a second communicator associated with a second storage area. Further, the method includes querying, via a processor, a database to determine a first profile associated with the first data and a second profile associated with the second data. Additionally, the method includes determining, via the processor, a first special effect associated with the first profile and a second special effect associated with the second profile and providing, via a transmitter, a command to present the first special effect at a first location associated with the first storage area and provide a command to present the second special effect at a second location associated with the second storage area.

In an embodiment, a locker system includes a first storage area and a second storage area, and a first communicator and a second communicator each configured to read information from an interactive object, wherein the first communicator is configured to monitor the first storage area and the second communicator is configured to monitor the second storage area. The system further includes a controller comprising a processor and a memory, wherein the controller is configured to: receive first data from the first communicator and second data from the second communicator; query a database to determine a first profile associated with the first data and a second profile associated with the second data; determine a first special effect associated with the first profile and a second special effect associated with the second profile; and initiate presentation of the first special effect at a first location associated with the first storage area and initiate presentation of the second special effect at a second location associated with the second storage area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
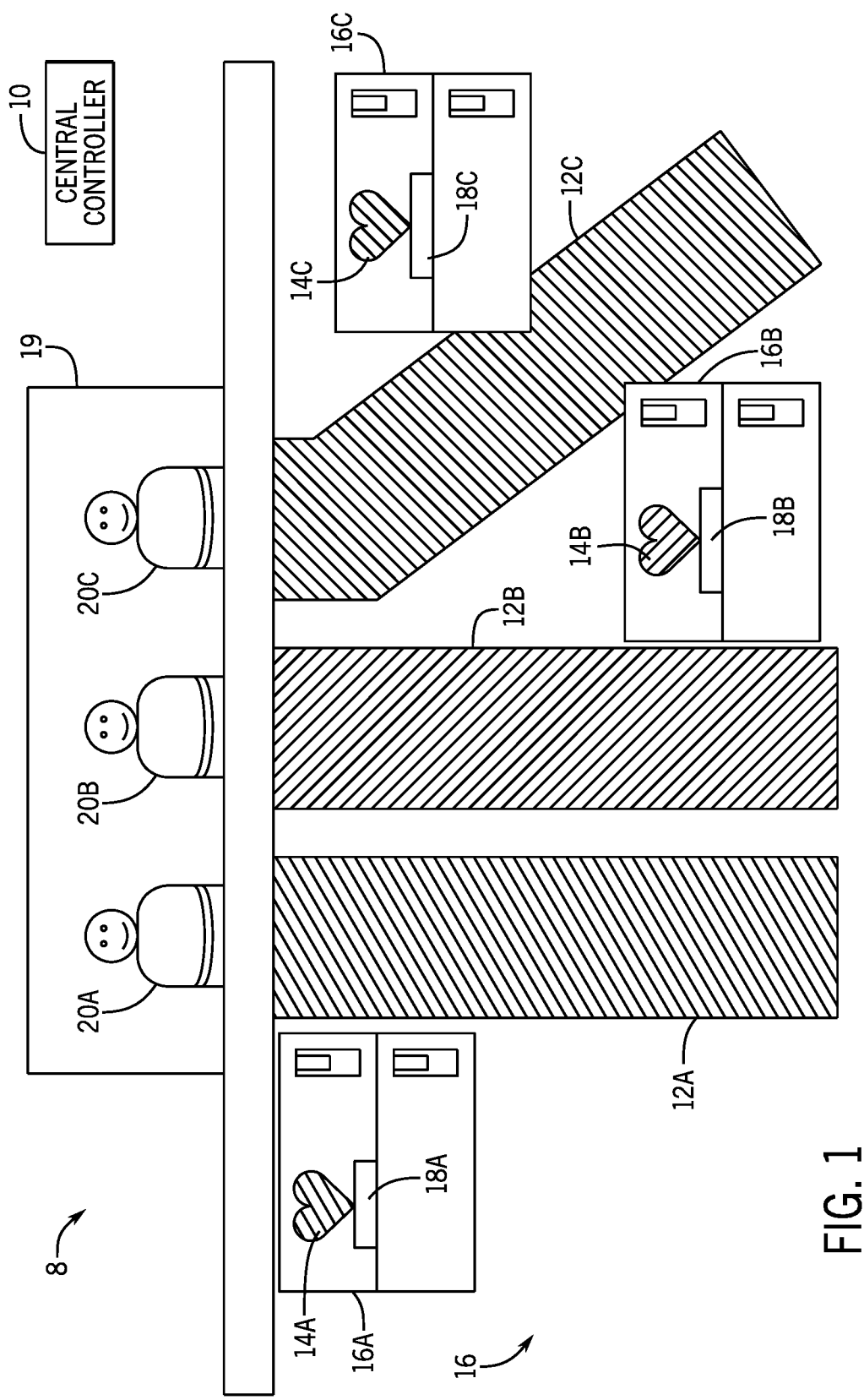
FIG. 1 is a schematic illustration of an embodiment of a storage area (e.g., locker, storage container, shelf) and ride show system, in accordance with present techniques.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Guests in a theme park may carry one or more interactive objects (e.g., handheld objects, wearable objects) throughout one or more areas within the theme park. Each of the interactive objects may be linked to an individual guest and may be utilized to track guests' experiences throughout one or more ride shows and/or interactive areas of the theme park. For example, in addition to allowing a guest to interact with gaming or entertainment interfaces throughout a theme park or other entertainment venue, an interactive object may also facilitate tracking of achievements, locations, interactions, and so forth by allowing monitoring of the interactive object and its uses.

In some situations, it may not be desirable for a guest to maintain physical possession of an interactive object on a particular entertainment experience, such as a ride show. For example, it may be desirable to store the interactive object (e.g., in a locker) to avoid losing the interactive object along a ride path or the like. However, it is now recognized that the guest may wish for the ride show experience to be personalized to the individual guest through linking of the guest interactive object to a position of the guest (e.g., a seating location of the guest on a ride vehicle) while within the ride show. In this way, the ride show may display personalized special effects based on the guest's position within the ride show. Therefore, it is now understood that linking of a guest interactive object to a guest position within a ride show may enable a more personalized and enjoyable ride show experience.

In accordance with present embodiments, an interactive object (or one or more systems that detect the interactive object) may update a profile associated with the guest based on the guest's movement and/or experiences within entertainment experience systems, such as ride shows and/or interactive areas. For example, the ride shows and/or interactive areas may receive the guest profile data from the guest interactive object or from a system for detecting and identifying the interactive object and may personalize the special effects within the ride show and/or interactive areas based on the guest profile.

Individually tracking one or more guests within a ride show and/or interactive environment using an interactive object may be challenging because a user may need to be separated from the interactive object on occasions. A guest may wait in one or more lines and/or ride queue areas prior to boarding a ride vehicle or entering an interactive area. During such waiting (e.g., while in a queue area), there may be opportunities for the guest to employ the interactive object for entertainment. Thus, the guest may be incentivized to keep the interactive object in their possession. However, the guest may need to relocate their interactive object to a locker or storage area prior to boarding a ride vehicle and/or entering an interactive area to, for example, avoid potentially losing the interactive object. This could limit functionality associated with the interactive object (e.g., limit communication with and tracking of the interactive object). To address this, in accordance with present embodiments, the storage area (e.g., a locker) may include a detection system (e.g., including radio frequency isolation hardware) that may receive (e.g., obtain) a guest profile of the guest. The guest profile may be received directly from the interactive object or from a computing system (e.g., a server, database, and cloud network) based on detection of the interactive object and identification of a guest profile associated with the detected interactive object. Present embodiments may also operate to link the guest to a guest position (e.g., a seat of a ride vehicle and/or position within an interactive environment). For example, a line or queue the guest is standing in may correspond to a specific set of lockers and/or storage compartments that correspond to guest location throughout the ride show experience (e.g., based on predetermined correspondence).

The disclosed interactive object techniques permit user identification and/or interactive object identification and targeting to facilitate elements of a ride show. For example, when guests enter a queue area and/or line of the ride show, the guest may be assigned a specific shelf and/or locker for their interactive object that is associated with a specific seat and/or position within a ride vehicle and/or interactive environment. The interactive object may be placed within the locker and/or storage area that may include hardware that enables near-field communication (NFC) between the interactive object and a communicator (e.g., a sensor, detector, barcode reader, NFC device) of the locker and/or storage area, the communicator operable to detect and communicate information related to the interactive object. Such hardware may also include a charger for rechargeable interactive objects. Based on a correlation between an identifier of the interactive object (as detected by the communicator) and a guest profile, the communicator may receive or determine a guest profile associated with the guest located within the specific seat and/or position within the ride vehicle. The communicator may send the guest profile and/or identification information to a central controller along with guest ride location information. The central controller may then direct special effects within the ride show to the specific guest within the ride seat based on the guest profile received via the interactive object. Additionally, the central controller may update the guest profile associated with the interactive object based on the guest experience and special effects displayed within the ride show system.

Such interactive objects may be, in an embodiment, a prop or toy used within an interactive environment to permit greater variability in special effect control by using individualized guest interactives. The interactive objects may include barcodes, radio frequency identification (RFID) tags, near-field communications (NFC), and so forth that facilitate one-way or two-way communications. The user interactive objects may thus enable guest profiles to be associated with the interactive objects. A guest profile can then be identified and used to select special effects that are based upon the guest profile. For example, guest preferences may be taken into account for variable effects. Further, it should be appreciated that, while embodiments of the present disclosure are discussed in the context of a toy, prop, or handheld object, such as a sword, wand, token, book, ball, or figurine, it should be understood that the disclosed embodiments may be used with other types of objects. Such objects may include wearable objects (e.g., clothing, jewelry, bracelets, headgear, medallions, glasses) or other non-wearable objects (e.g., a smart phone).

While not limited to specific environments, the disclosed systems and methods may include at least one ride show system of a themed area having a common theme and may additionally include different ride show systems within the single themed area. Further, the disclosed systems and methods may include additional or other ride show systems having different themes but that are contained within a theme park or entertainment venue.

Certain aspects of the present disclosure may be better understood with reference to FIG. 1, which is a schematic illustration of an embodiment of a ride show system 8, in accordance with the present disclosure. In one embodiment, a central controller 10 of the ride show system 8 is configured to receive interactive object information (e.g., a unique device identification number) from one or more interactive objects 14A, 14B, 14C (cumulatively referred to as interactive objects 14) stored in a locker system 16. The locker system 16, which may include multiple locker systems or lockers (e.g., lockers 16A, 16B, 16C) may serve as protected storage (e.g., lockable storage) for the interactive objects 14. However, the locker system 16 may be representative of any storage area (e.g., a storage area 16). For example, in other embodiments, the locker system 16 may include shelving, compartments, drawers, or the like that may or may not be lockable. The locker system 16 may be employed for storage of the interactive objects 14 prior to entering a ride or other entertainment experience for which it is desirable to store the interactive objects 14.

The interactive objects 14 may include features that facilitate interaction of guests with interfaces in various locations (e.g., open areas, queues, restaurants, attractions) of a controlled environment (e.g., a theme park). For example, the interactive objects 14 may be used to control a video display or video game. The interactive objects 14 may include processing and memory or may simply be detectable by external computer-based systems. The interactive objects 14 may be specifically associated with a particular individual or guest and may be used to track progress, experience, and so forth with respect to games, attractions, venues, and the like. For example, identification information for a guest may be stored on or accessible on a device (e.g., a radio frequency identification tag or on a memory) of a particular interactive object or on a separate device (e.g., a database that correlates identification information for guests with readable serial numbers of interactive objects).

As noted above, while the interactive objects 14 may simply be detectable by certain systems, in certain embodiments the interactive objects may include memory and or processing features that require power. Thus, in accordance with present embodiments, the interactive objects 14 may include energy sources such as batteries. These energy sources may be rechargeable energy sources (e.g., a battery, a super capacitor) that may buffer and store energy from a power source of the locker system 16, such as a communicator 18 or separate charger. The rechargeable energy source may be used to accomplish a power boosting effect and facilitate providing output regardless of location of the interactive object 14. In one embodiment, the interactive objects 14 may be recharged while within the locker system 16, such as via a near-field communication device that may be incorporated therein.

As noted above, the interactive objects 14 may store or otherwise have a detectable link to interactive object information. This may be detected and communicated in accordance with present embodiments. For example, a barcode of an interactive object may be scanned or memory of an interactive object 14 may be read and associated information may be identified for purposes of operational control. Indeed, in accordance with present embodiments, the central controller 10 may receive the interactive object information from the interactive objects 14 via communicators 18 (e.g., reading devices, receivers). The communicators 18, which may include multiple separate communicators 18A, 18B, 18C, are positioned to communicate with the interactive objects 14 while the interactive objects 14 are stored in the locker system 16. For example, the communicator 18A may be integrated with, disposed in, aimed at, or otherwise positioned to communicate with the interactive object 14A when the interactive object 14A is positioned in the locker 16A. In some embodiments, walls or other boundaries of the locker system 16 may operate to block wireless communication other than that available via the communicators 18. Moreover, the locker system 16 may include signal shielding composed of a material that may block the wireless communication other than the wireless communication provided by each of the communicators 18 located in the locker system 16 (e.g., communicator 18A located in locker 16A, and so on). For example, the locker system 16 may operate like a Faraday cage. This may facilitate an increased certainty of a determined correlation between detection and location of the interactive objects 14. Indeed, certain communicators 18 may be configured to access (e.g., observe, read, monitor) a specific storage area (e.g., locker 16A, 16B, 16C, etc.) and not others, which strengthen detection/position correlation.

The communicators 18 may communicate with the one or more interactive objects 14 using near-field communication (NFC) or similar operations (e.g., radio frequency identification (RFID) operations) to receive the interactive object information (e.g., guest profile information, identification number, identification code) from within the locker system 16 and then pass the interactive object information along to the central controller 10. Transmission from the communicators 18 to the central controller 10 may be performed wirelessly or over a wired connection. Further, the communicators 18 may include a charging function for recharging energy storage (e.g., batteries) of the interactive objects 14. This may be done via induction or other charging techniques. While, in the illustrated embodiment, the communicators 18 each represent a charger in addition to a communications mechanism, in other embodiments a charger is provided separately from the communicators 18.

As illustrated, the ride show system 8 may include multiple ride queue areas 12A, 12B, 12C (cumulatively referred to a ride queue areas 12). It should be understood that any suitable number of ride queue areas 12 and/or locker systems 16 may be implemented in accordance with present embodiments based on the ride show system's occupancy and/or layout. The ride queue areas 12 may each correspond to a guest position within the ride show system 8. For example, each ride queue area 12A, 12B, 12C may lead to a specific guest position, such as a seat or row within the ride vehicle 19. Thus, a guest may enter a particular one of the ride queue areas 12 to eventually be seated in a particular ride vehicle (e.g., a front vehicle of a roller coaster train) or seat within a ride vehicle. As an example, the guest position may be within the ride vehicle 19 of the ride show system 8 and/or a standing or seated position within the ride show system 8.

The ride queue areas 12 may include or provide access to one or more of the locker systems 16 that correspond each ride queue area 12. Thus, for example, a guest that is about to enter a ride vehicle from a queue area may store his or her interactive object in a locker that is accessible from the queue area and associated with the ride vehicle being entered. By positioning certain lockers to be accessible from certain ride queue areas, such lockers may be effectively associated with the ride queue areas and corresponding guest positions (e.g., a ride vehicle or seating within a ride vehicle). For example, specific lockers of the locker system 16 may be positioned prior to specific entry points for the ride vehicle 19. Accordingly, when an interactive object that is associated with a guest is placed in such a locker, a conclusion can be made that the information associated with that interactive object can be linked to the related guest position. For example, the one or more lockers 16A, 16B, 16C may respectively include the communicators 18A, 18B, 18C for communicating with a respective one of the guest interactive objects 14A, 14B, 14C being stored therein. When, for example, interactive object 14A is detected in locker 16A by communicator 18A, the interactive object 14A (and corresponding guest data) may be associated with a guest position that correspond thereto. Thus, the information obtained via the communicators 18 (e.g., communicator 18A) may be employed to specialize an experience for the guest in the associated guest position.

As previously noted, each locker (e.g., lockers 16A, 16B, 16C) within the locker system 16 may include communication isolation (e.g., radio frequency isolation) features (e.g., a Faraday cage), so that identification information from multiple of the interactive objects 14 within the locker system 16 is not received by a single one of the communicators 18. This may avoid location confusion based on a specific one of the communicators 18 detecting an interactive object 14 not stored in a corresponding locker. For example, in the illustrated embodiment, communicator 18A may be blocked from detecting interactive object information from the interactive object 14B because the communicator 18A is positioned to only read data from within the locker 16A and is blocked from reading data from within the locker 16B by characteristics or functionality of the locker 16B. Additionally, to avoid confusion associated with potential detection of multiple interactive objects 14, the lockers (e.g., lockers 16A, 16B, 16C) of the locker system 16 may be configured (e.g., shaped and sized) to only receive a single interactive object 14. Because of such features in accordance with present embodiments, the central controller 10 may be able to reliably associate information from the communicator 18A with locker 16A and a location associated therewith.

The communicator 18 (e.g., radio frequency sensor) may transmit the identification information and locker location information associated with the interactive object to a central controller 10 of the ride show system 8. Locker location information may simply be an identity of the specific communicator 18 and the central controller 10 may store and/or recognize an association between the specific communicator 18 and a specific one of the lockers 16. The central controller 10 may utilize the identification information to look up a guest profile stored within one or more guest profile databases that is associated with the guest interactive object 14. The central controller 10 may then direct special effects corresponding to the guest location based on the guest's interactive object profile which may include past guest experiences throughout one or more ride show systems. In this way, the guest experience throughout ride show systems 8 may be personalized based on past guest experiences throughout multiple ride show systems 8.

It is understood that guests may trade their interactive objects 14. Thus, possession and detection of a particular interactive object 14 may not definitively indicate the presence of a particular guest associated with a guest profile. Nevertheless, detection of a particular interactive device associated with a particular guest may be treated as correctly associated with physical presence of the particular guest in accordance with present embodiments. One of ordinary skill in the art will understand that presently disclosed systems and methods will operate accordingly.

As an example of how present embodiments may operate, a first guest 20A may enter a first queue area 12A corresponding to a first locker system. For illustrative purposes, the first locker system may be represented by the locker 16A. The first guest 20A may place their interactive object 14A within the locker 16A, and the first locker 16A may include the communicator 18A that transmits an identification number associated with the first guest's interactive object 14A along with the guest position data, which may be implicit from detection by the communicator 18A. For example, the guest position data may be correlated to or include an indication that the interactive object 14A (associated with the first guest 20A) is within the first queue area 12A corresponding to a first seat within the ride vehicle 19. Thus, the first guest 20A may be considered to be positioned in the first seat within the ride vehicle 19. At the same time, a second guest 20B may enter a second queue area 12B and a third guest 20C may enter a third queue area 12C. The second queue area 12B may correspond to a second locker system (represented by locker 16B) and the third queue area 12C may correspond to a third locker system (represented by locker 16C). The second guest 20B and the third guest 20C may respectively place the second guest interactive object 14B and the third guest interactive object 14C within the respective lockers 16B, 16C. The respective communicators 18B, 18C within each of the lockers 16B, 16C may detect and transmit the second guest interactive object information and the third guest interactive object information, along with the second guest position within the ride vehicle 19 and third guest position within the ride vehicle 19 to the central controller 10.

Continuing with the example provided above, the central controller 10 may query the one or more databases for the guest profiles corresponding to the first guest interactive object information, the second guest interactive object information, and the third guest interactive object information, and customize effects for the ride show system 8 to specifically entertain or otherwise correspond to the first guest 20A, the second guest 20B, and the third guest 20C based on the guest profiles and their assumed seating arrangements. In this way, specialized effects can be provided to multiple different guests in the same ride. For example, the first guest 20A may prefer first theming and the second guest 20B may prefer second theming and effects may be adjusted to include appropriate theming for each guest separately on the same ride show system 8. If the first guest 20A and the second guest 20B trade their interactive objects 14, they may each be treated as the other by present embodiments.

Present embodiments may address a lack of information from an interactive object by proceeding with a default or utilizing a different technique for identifying a guest profile. For example, in one embodiment, no locker input may be detected for the first guest 20A in the first queue area 12A. In this example case, the communicator 18A associated with the first locker 16A may send a signal to the central controller 10 that indicates no guest interactive object 14 has been identified for the locker 16A, which is associated with a particular ride vehicle, seating area, or the like. Based on provision of this data, the central controller 10 may then send instructions to display default special effects (or no special effects) for the guest in the location associated with the locker 16A. The special effects may include any visual effects, haptic effects, audio effects, animated figure effects, or any other special effects corresponding to the ride show system 8. In some cases, some special effects of the ride show system may be the same for all guests (e.g., all guests seated within the ride vehicle 19), and a select one or more effects may be customized for each guest based on guest profile data associated with each of the guest's interactive objects 14A, 14B, 14C. As an alternative, facial recognition and other identification mechanisms may be used to associate a particular guest with a guest profile and special effect preferences.

Figure 2:
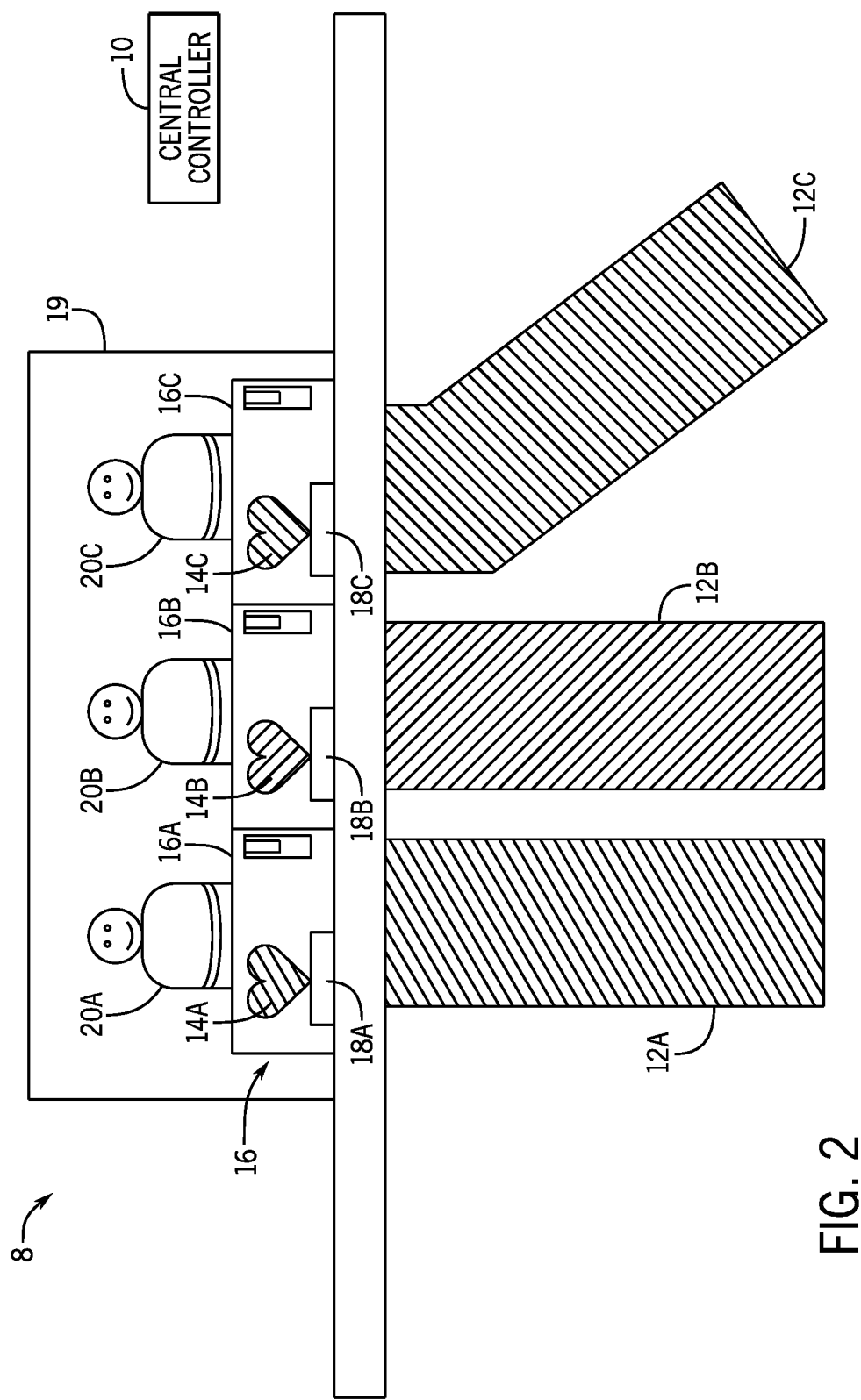
FIG. 2 is a schematic illustration of an additional embodiment of a storage area and ride show system, in accordance with present techniques.

FIG. 2 is a schematic illustration of an additional embodiment of the ride show system 8, in accordance with present techniques. As illustrated by FIG. 2, the ride show system 8 may include the ride vehicle 19 having the locker system 16 within the ride vehicle 19, such that guests may utilize a locker (e.g., locker 16A, 16B, 16C) within the ride vehicle 19 (e.g., below a seat of the ride vehicle 19) for storage of the interactive objects 14. As with previous disclosed embodiments, the communicators 18 in the locker system 16 may detect the stored interactive objects 14. By identifying a specific communicator (e.g., communicator 18A, 18B, 18C) that detects a particular interactive object (e.g., interactive object 14A, 14B, 14C), the central controller 10 may be informed of a likely user location (e.g., seating location within a vehicle). Indeed, guests may be encouraged or instructed to store their interactive objects in their own seating location. Further, in some embodiments, guests may be blocked from storing their interactive objects outside of intended locations by barriers and physical structures. Thus, if the interactive object 14A associated with the guest 20A is detected within the locker 16A, the central controller 10 may associate a profile for the guest 20A with the seating location that corresponds to locker 16A. Specifically, the central controller 10 may receive interactive object information (e.g., unique device identification numbers) from the communicators 18 to identify associated guest profiles. Information corresponding to the guest profiles may be associated with specific locations (e.g., seating areas) based on where respective communicators 18 are located and which interactive object information was respectively detected. This may enable personalization of special effects throughout the ride show system 8 based on the guest profile of the guest within each seat of the ride vehicle 19. As with the previously discussed embodiment, each locker within the locker system 16 may include communication isolation (e.g., radio frequency isolation) features, so that identification information of interactive objects 14A, 14B, 14C within the locker system 16 is blocked from being transmitted beyond certain boundaries.

As a further example of operation in accordance with present embodiments, upon detection of interactive object information from the interactive object 14A by the communicator 18A (e.g., radio frequency sensor), the communicator 18A may transmit the interactive object information or correlated information (e.g., associated guest identification information) and location information (e.g., an associated seat) to the central controller 10 of the ride show system 8. Since the communicator 18A is in a specific position relative to seating (e.g., under the seat for the guest 20A) and is blocked from detecting the interactive objects 14 in other parts of the locker system 16, the central controller 10 may be operable to determine a location of the guest 20A (i.e., the guest associated with the interactive object 14A). Again, it should be noted that guests may trade their interactive objects 14. Thus, possession and detection of a particular interactive object 14 may not definitively indicate the presence of a particular guest associated with a guest profile. Nevertheless, detection of a particular interactive device associated with a particular guest will be treated as correctly associated with the particular guest and one of ordinary skill in the art will understand that presently disclosed systems and methods will operate accordingly.

The central controller 10 may utilize information provided by the communicator 18A to look up a guest profile stored within one or more guest profile databases that is associated with the guest interactive object 14A. The central controller 10 may then direct special effects corresponding to the guest location based on the guest's interactive object profile which includes past guest experiences throughout one or more ride show systems 8. In this way, the guest experience throughout ride show systems 8 may be personalized based on past guest experiences throughout multiple ride show systems 8.

Figure 3:
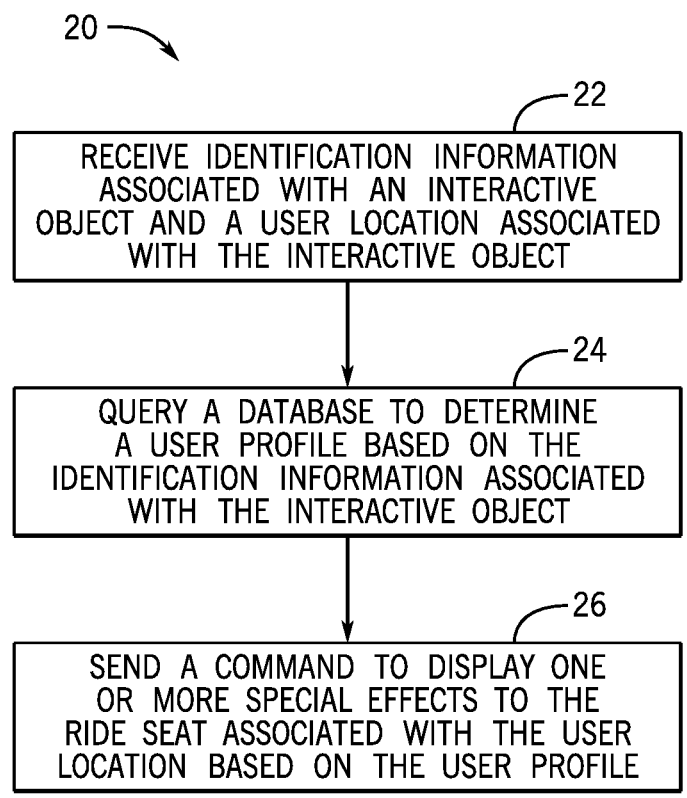
FIG. 3 is a flow diagram of a method of linking a user interactive object to a guest position within the ride show system, in accordance with present techniques.

FIG. 3 illustrates a flow diagram of a method 20 linking a guest interactive object 14 to a guest position within a ride show system 8, in accordance with present techniques. The method 20 includes a process of detecting an interactive object 14 located within a locker system 16 that corresponds to a specific guest location within a ride vehicle 19. The locker system 16 may determine identification information of the interactive object 14 and transmit the identification information to the central controller 10 to use to determine a guest profile associated with the interactive object 14 and direct ride show system special effects based on the guest profile to the specific guest location within the ride vehicle 19.

The method 20 includes the central controller 10, at block 22, receiving identification information associated with the interactive object 14 and a guest location associated with the interactive object 14 from hardware of the locker system 16. The hardware of the locker system 16 may include receiver hardware that implements NFC methods to receive identification information from the interactive object 14 placed within the locker system 16. The interactive object 14 may communicate interactive object information via a radio frequency identification (RFID) tag or any other suitable wireless and/or wired communication method. The identification information may include an identification number associated with the guest of the interactive object, a symbol associated with the guest of the interactive object, or any other suitable identification information. The locker system 16 may be located within the ride vehicle 19 or may be located external to the ride vehicle 19 within a queue system and/or waiting area of the ride show system 8.

The location information may be sent based on the locker location and associated ride vehicle seat. For example, each seat of the ride vehicle may correspond to a specific locker. In other embodiments, each line queue may include a set of lockers, and each line queue may correspond to a specific seat of the ride vehicle. In this way, the locker system 16 may transmit the guest location along with guest interactive object data.

The central controller 10, at block 24, queries one or more databases that include guest profiles associated with interactive objects 14 based on the interactive object identification information. The central controller 10 may determine a guest profile that corresponds to the interactive object 14. The guest profile may be included in a memory of the central controller 10 that may store guest profiles of multiple guests who have previously been matched to the multiple interactive objects 14. The guest profiles can then be updated based on the guests' experiences that may take place throughout the ride show system. This historical data can then later be employed to provide a variety of different experience or make other such adjustments based on the historical data.

In some embodiments, the central controller 10 is able to update guest profiles based on the guests' experiences throughout one or more ride show systems. This enables special effects to be differentiated based on guest profile data throughout ride show systems 8, and within multiple visits to the same ride show system 8. The guest profile can also include information that is associated with a guest, which may comprise guest specific characteristics that are predetermined before first use of interactive object 14 and after first use thereof. These characteristics can enable further differentiation of special effect commands based on the specific guest within the ride vehicle 19. For example, if a guest requested a specific affiliation to a group or selected a specific category from a preset selection of categories, the guest profile can be updated to display this information. The central controller 10 may then send commands to special effects of the ride show system 8 to display special effect signals based in part on the guest profile. This may comprise the output of a specific color LED, a sound effect, a haptic effect, a visual projection, or any combination thereof.

The central controller 10, at block 26, sends a command to one or more special effect systems of the ride show system 8 to display specific special effects to each of the ride seats of the ride vehicle based on the guest profiles associated with each of the guests identified as (e.g., assumed to be) located within the ride seats. The guest is then able to perceive distinct special effects (e.g., visual, auditory, haptic) throughout the ride show system. Additionally, the central controller 10 may subsequently update the one or more guest profiles associated with the guests of the ride vehicle 19, based on the special effects displayed to each of the guests during experiences throughout the one or more ride show systems. By storing data related to past experiences of special effects, future effects can be tailored for the guest to encourage variety or to focus on effects the guest seems to prefer. It should be understood that the guest profile may be updated throughout guest's experiences in one or more ride show systems 8.

While only certain features of presently disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An entertainment system comprising:
   a first storage area positioned prior to an interactive area within the entertainment system and configured to receive a first interactive object associated with a first guest;
   a first communicator configured to detect first information from the first interactive object by monitoring, the first storage area; and
   a controller comprising a processor and a memory, wherein the controller is configured to:
      receive first data from the first communicator based on the first information from the first interactive object within the first storage area;
      query a database to determine a first guest profile associated with the first guest based on the first data;
      determine a first special effect associated with the first guest profile; and
      provide a command to present the first special effect at a first location of the interactive area based on an association of the first location and the first storage area.

2. The entertainment system of claim 1, wherein the first storage area comprises signal shielding to block wireless communications that do not come from within the first storage area.

3. The entertainment system of claim 1, wherein the first communicator is integrated with or disposed in the first storage area.

4. The entertainment system of claim 1, wherein the first storage area comprises a locker configured to lock.

5. The entertainment system of claim 1 comprising:
   a second storage area positioned prior to the interactive area within the entertainment system and configured to receive a second interactive object associated with a second guest;
   a second communicator configured to detect second information from the second interactive object by monitoring the second storage area, and wherein the controller is configured to:
      receive second data from the second communicator;
      query the database to determine a second guest profile associated with the second guest based on the second data;
      determine a second special effect associated with the second guest profile; and
      provide an additional command to present the second special effect at a second location of the interactive area different from the first location based on an additional association of the second location and the second storage area.

6. The entertainment system of claim 1, wherein the controller is configured to:
   receive first position data associated with the first storage area from the first communicator based on the first communicator detecting the first information from the first interactive object within the first storage area; and
   provide the command to present the first special effect at the first location based on the first position data being indicative of the first location.

7. The entertainment system of claim 6, comprising a first queue area, wherein the first storage area is accessible from the first queue area, and wherein the first queue area is configured to guide the first guest to the first location of the interactive area.

8. The entertainment system of claim 7, comprising a ride vehicle, wherein the first location is associated with a first seat of the ride vehicle, and wherein the first queue area is configured to guide the first guest to the first seat.

9. The entertainment system of claim 1, wherein the first storage area comprises a radio frequency isolation device.

10. The entertainment system of claim 1, wherein the first communicator is configured to use near-field communication (NFC) to detect the information.

11. The entertainment system of claim 1, wherein the controller is configured to update the first guest profile based on one or more movements of the first guest within the interactive area, one or more experiences of the first guest within the interactive area, or both.

12. The entertainment system of claim 1, wherein the first interactive object comprises a handheld object or a wearable object configured to be carried by the first guest.

13. A method comprising:
receiving, via a receiver, first data from a first communicator associated with a first storage area based on the first communicator detecting a first interactive object within the first storage area, wherein the first storage area is positioned prior to a ride show area within an entertainment system and configured to receive the first interactive object;
querying, via a processor, a database to determine a first guest profile associated with the first interactive object based on receiving the first data;
determining, via the processor, a first special effect associated with the first guest profile; and
providing, via a transmitter, a command to present the first special effect at a first ride show location of the ride show area based on the first storage area storing the first interactive object.

14. The method of claim 13, wherein the first interactive object is associated with a first guest, and wherein the first data comprises first identifying information associated with the first guest and first location information associated with the first storage area.

15. The method of claim 14, wherein the first communicator is integrated with or disposed in the first storage area, and wherein the first location information is indicative of the first ride show location.

16. The method of claim 15, comprising:
determining, via the processor, that second identifying information is not received from a second communicator associated with a second storage area, wherein the second storage area is positioned prior to the ride show area; and
providing, via the transmitter, an additional command to present a default special effect at a second ride show location of the ride show area based on determining that the second identifying information is not received from the second communicator, wherein the second storage area is associated with the second ride show location.

17. A locker system comprising:
a storage area positioned prior to a ride show area and along a first queue area of a plurality of queue areas configured to direct one or more guests to the ride show area, wherein the storage area is accessible from the first queue area;
a communicator configured to detect information from an interactive object by monitoring the storage area; and
a controller comprising a processor and a memory, wherein the controller is configured to:
receive data from the communicator based on the information from the interactive object within the storage area;
query a database to determine a guest profile associated with the data;
determine a special effect associated with the guest profile; and
initiate presentation of the special effect at a first location of the ride show area based on the first queue area being configured to direct the one or more guests to the first location and the storage area storing the interactive object.

18. The locker system of claim 17, wherein the first storage area comprises a first locker configured to receive one or more interactive objects.

19. The locker system of claim 17, wherein the controller comprises a central controller associated with a ride system.

20. The locker system of claim 17, wherein the first storage area comprises a charger configured to recharge the first interactive object.

* * * * *